United States Patent
Johri et al.

(10) Patent No.: US 9,475,483 B2
(45) Date of Patent: Oct. 25, 2016

(54) HYBRID VEHICLE INCLUDING A PREVENT POWERTRAIN GEAR HUNTING STRATEGY

(71) Applicant: FORD GLOBAL TECHNOLOGIES, LLC, Dearborn, MI (US)

(72) Inventors: Rajit Johri, Canton, MI (US); Ming Lang Kuang, Canton, MI (US); Mark Steven Yamazaki, Canton, MI (US); Xiaoyong Wang, Novi, MI (US); Wei Liang, Farmington Hills, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/547,566

(22) Filed: Nov. 19, 2014

(65) Prior Publication Data
US 2016/0137182 A1  May 19, 2016

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2016.01) |
| *B60W 10/06* | (2006.01) |
| *B60W 10/08* | (2006.01) |
| *B60W 10/02* | (2006.01) |
| *B60K 6/387* | (2007.10) |

(Continued)

(52) U.S. Cl.
CPC .............. *B60W 20/10* (2013.01); *B60K 6/387* (2013.01); *B60K 6/547* (2013.01); *B60W 10/026* (2013.01); *B60W 10/06* (2013.01); *B60W 10/08* (2013.01); *B60W 10/115* (2013.01); *B60W 20/30* (2013.01); *B60W 20/40* (2013.01); *B60W 50/06* (2013.01); *B60K 2006/4825* (2013.01); *B60W 2050/0091* (2013.01); *B60W 2510/244* (2013.01); *B60W 2520/10* (2013.01); *B60W 2540/10* (2013.01); *B60W 2710/024* (2013.01); *B60W 2710/083* (2013.01); *B60W 2710/1005* (2013.01); *F16H 2061/163* (2013.01); *Y10S 903/93* (2013.01)

(58) Field of Classification Search
CPC ...... F16H 61/702; F16H 61/10; F16H 47/04; F16H 61/462; F16H 59/40; F16H 61/42; F16H 59/48; F16H 2059/6815
USPC ............ 701/22, 54, 55, 64, 79; 477/120, 42, 477/130, 154, 108
See application file for complete search history.

(56) References Cited

U.S. PATENT DOCUMENTS

| | | | |
|---|---|---|---|
| 5,669,850 A * | 9/1997 | Dourra ................. | B60K 31/047 477/108 |
| 5,738,605 A | 4/1998 | Fliearman et al. | |
| 6,083,139 A * | 7/2000 | Deguchi ................. | B60K 6/442 180/65.23 |

(Continued)

*Primary Examiner* — Jaime Figueroa
(74) *Attorney, Agent, or Firm* — David Kelley; Brooks Kushman P.C.

(57) ABSTRACT

A vehicle is provided. The vehicle includes an engine, a motor, and a controller. The controller is programmed to inhibit a scheduled transmission downshift and increase a torque of the motor for a specified period of time in response to a torque demand being greater than a maximum torque capability of the engine but less than a maximum combined torque capability of the engine and motor. Upon expiration of the specified period of time, the controller may permit the downshift to occur. The specified period of time may be based on a state of charge of a battery at a time when the torque demand exceeds the maximum torque capability of the engine.

20 Claims, 5 Drawing Sheets

(51) Int. Cl.
  *B60W 50/06* (2006.01)
  *B60K 6/547* (2007.10)
  *B60W 10/115* (2012.01)
  *B60K 6/48* (2007.10)
  *B60W 50/00* (2006.01)
  *F16H 61/16* (2006.01)

(56) References Cited

U.S. PATENT DOCUMENTS

| | | | |
|---|---|---|---|
| 6,098,004 A | 8/2000 | Grytzelius et al. | |
| 6,220,987 B1 | 4/2001 | Robichaux et al. | |
| 6,393,945 B1 * | 5/2002 | Kuras | F16H 47/04 475/80 |
| 8,568,271 B2 | 10/2013 | Stoller et al. | |
| 2005/0082096 A1 * | 4/2005 | Oono | B60K 6/445 180/65.235 |
| 2009/0005941 A1 * | 1/2009 | DeMarco | F16H 61/462 701/51 |
| 2009/0234549 A1 * | 9/2009 | Silveri | B60K 6/485 701/70 |
| 2011/0172862 A1 * | 7/2011 | Ortmann | B60K 6/48 701/22 |
| 2011/0313628 A1 * | 12/2011 | Chinbe | F02D 29/02 701/54 |
| 2012/0065854 A1 * | 3/2012 | Stoller | F16H 61/702 701/60 |
| 2013/0109534 A1 | 5/2013 | Probert et al. | |
| 2015/0166064 A1 * | 6/2015 | Mitsuyasu | F16H 61/21 701/54 |

* cited by examiner

HYBRID VEHICLE INCLUDING A PREVENT POWERTRAIN GEAR HUNTING STRATEGY

TECHNICAL FIELD

The present disclosure relates to a hybrid vehicle having a prevent powertrain gear hunting strategy.

BACKGROUND

When a large powertrain torque demand in a vehicle cannot be met by the transmission in a presently selected gear, a controller may perform a downshift in order to meet the large torque demand. This may lead, however, to excessive gear shifting in the transmission, known as powertrain gear hunting, under certain circumstances.

SUMMARY

A vehicle is provided. The vehicle includes an engine, a motor, and a controller. The controller is programmed to inhibit a scheduled transmission downshift and increase a torque of the motor for a specified period of time in response to a torque demand being greater than a maximum torque capability of the engine but less than a maximum combined torque capability of the engine and motor. Upon expiration of the specified period of time, the controller may permit the downshift to occur. The vehicle may also include a torque converter that has a lock-up clutch. The controller may be further programmed to inhibit a transition of the lock-up clutch from a locked condition to an unlocked condition for the specified period of time. Upon expiration of the specified period of time, the controller may permit the transition of the lock-up clutch from the locked condition to the unlocked condition. The specified period of time may be based on a state of charge of a battery at a time when the torque demand exceeds the maximum torque capability of the engine.

A vehicle is provided. The vehicle includes an engine, an electric-machine, a battery, and a controller. The controller is programmed to prevent, for a specified period of time based on a state of charge of the battery, a downshift and increase, for the specified period of time, a torque output by the electric-machine, in response to a torque demand exceeding a torque limit of the engine but not a combined torque limit of the engine and electric-machine. Upon expiration of the specified period of time, the controller may permit the downshift and decrease the torque output on the electric-machine. The vehicle may also include a torque converter that has a lock-up clutch. The controller may be further programmed to inhibit a transition of the lock-up clutch from a locked condition to an unlocked condition for the specified period of time. Upon the expiration of the specified period of time, the controller may permit the transition of the lock-up clutch from the locked condition to the unlocked condition.

A method of controlling a hybrid vehicle having an engine and an electric-machine is provided. The method includes inhibiting a scheduled transmission downshift and increasing an electric-machine torque for a specified period of time, in response to a torque demand being greater than a maximum engine torque capacity but less than a maximum combined engine and electric-machine torque capacity. The method may also include permitting the scheduled downshift to occur after the specified period of time has expired. The hybrid vehicle may also include a torque converter that has a lock-up clutch. The method may additionally include inhibiting a transition of the lock-up clutch from a locked condition to an unlocked condition during the specified period of time, in response to the torque demand being greater than the maximum engine torque capacity but less than the maximum combined engine and electric-machine torque capacity. The specified period of time may be based on a state of charge of a battery at a time when the torque demand exceeds maximum engine torque capacity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
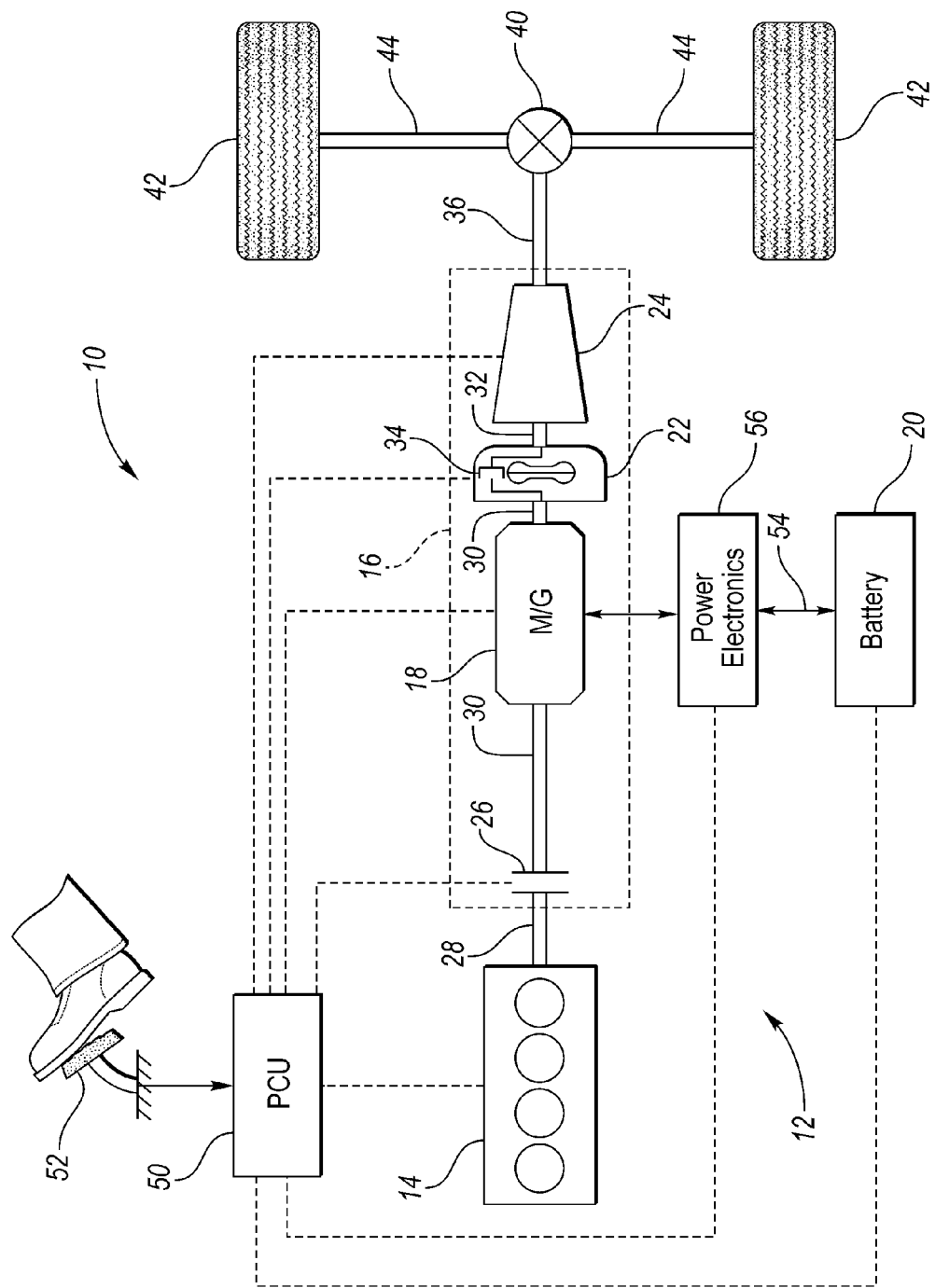
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
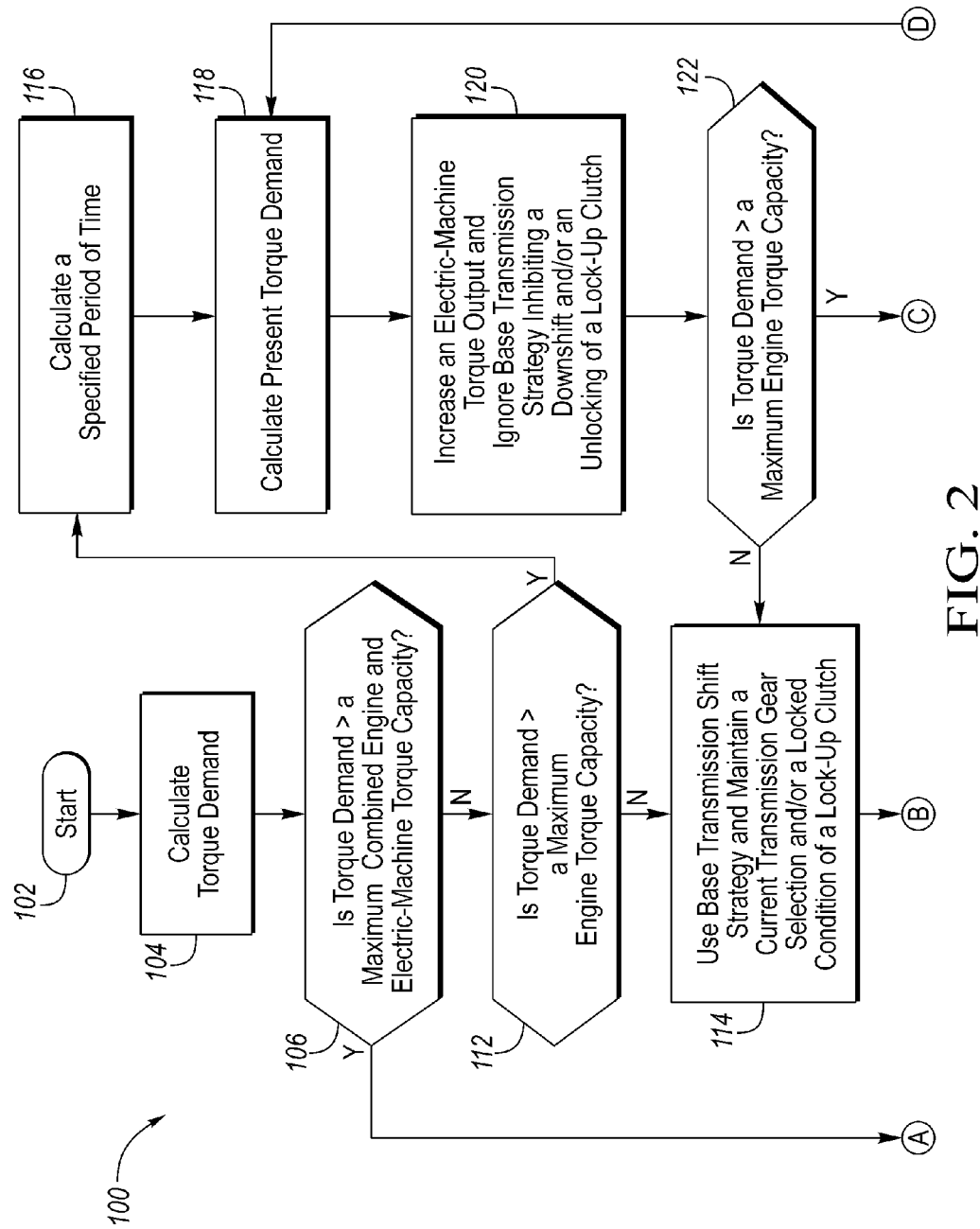
FIG. 2 is a flowchart illustrating a prevent powertrain gear hunting method in a hybrid electric vehicle during large torque demand.
Figure 2:
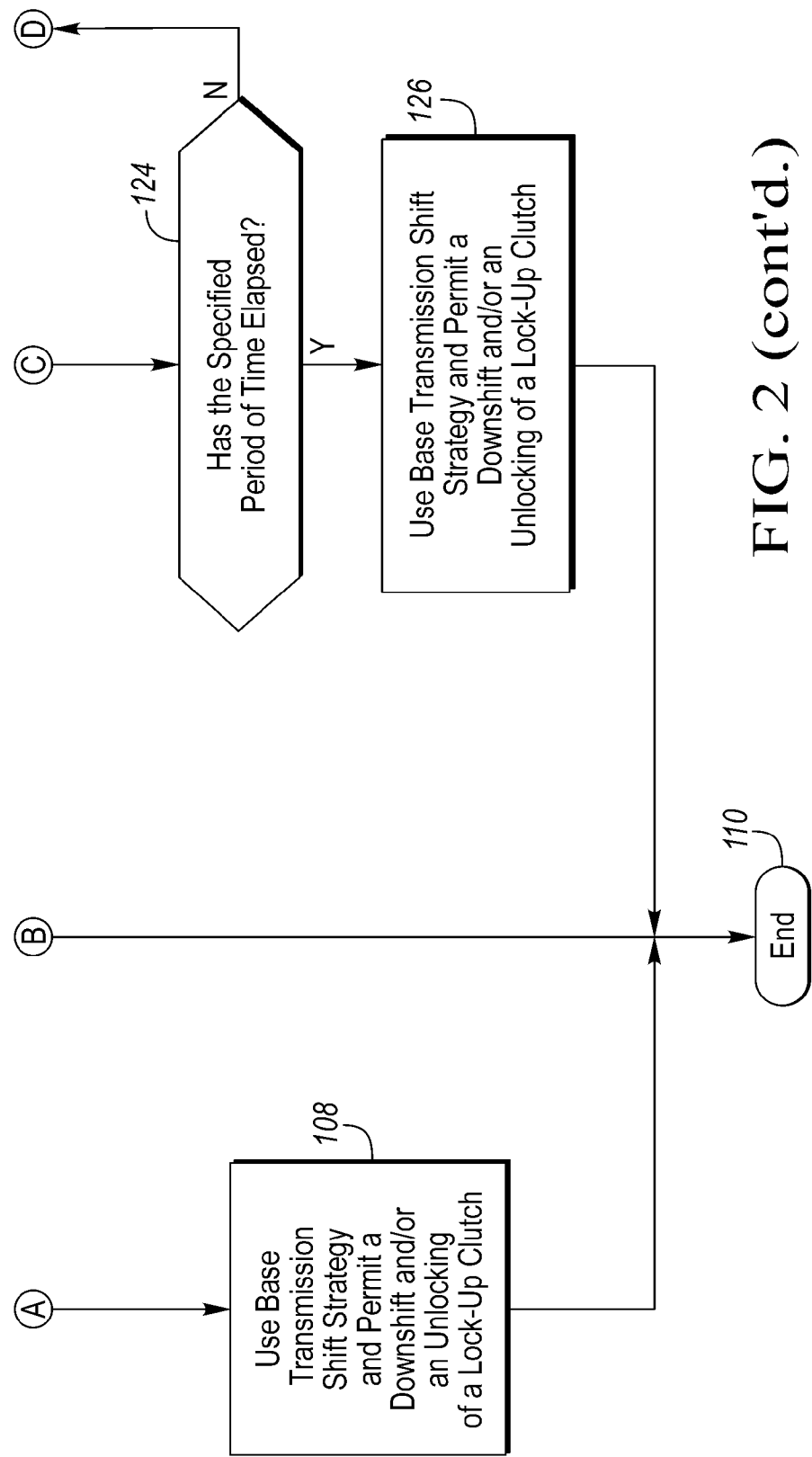

Referring to FIG. 2, a flowchart illustrating a prevent powertrain gear hunting method 100 in a hybrid electric vehicle during large torque demand is illustrated. The method 100 should not be construed as limited to the configuration as illustrated in FIG. 2, but should include variations where some of the steps may be rearranged and variations where some of the steps may be removed entirely. The method 100 may be implemented using software code contained within the controller 50. In other embodiments, the method 100 may be implemented in other controllers, or distributed among multiple controllers.

The method 100 is initiated at the start block 102. This may be accomplished when the driver of the vehicle 10 depresses the accelerator pedal 52 providing a torque demand. The torque demand is then calculated at step 104.

The demanded torque may refer to the demanded torque at the output of the powertrain 12, namely the torque at the output of the transmission or gearbox 24 or the torque output at wheels 42. If the torque demand is measured at the output of the powertrain 12 then it is also necessary to measure an engine torque, an electric-machine torque, a maximum engine torque capacity, a maximum electric-machine torque capacity, and a maximum combined engine and electric-machine torque capacity from the output of the powertrain 12, as well. The different torque capacities listed may also be referred to as torque capabilities or torque limits. In order to properly obtain these several torque values of both the engine 14 and the electric-machine 18 at the output of the powertrain 12, the output torque at the engine 14 and the output torque at the electric-machine 18 must be multiplied by the present driveline gear ratio (which is the gear ratio between the engine 14, electric-machine 18 and the output of the powertrain 12), which is dependent on the present gear selection of the transmission or gearbox 24. The driveline gear ratio may be the same between the engine 14 and the output of the powertrain 12, and the electric-machine 18 and the output of the powertrain 12. The driveline gear ratios between the engine 14 and the output of the powertrain 12, and the electric-machine 18 and the output of the powertrain 12 may not be the same in alternative configurations where, for example the engine and electric-machine are connected to different gears in a planetary gear set, such as in a power-split or series-parallel hybrid configuration.

At step 106 it is determined whether the torque demand is greater than a maximum combined engine and electric-machine torque capacity. If the torque demand at step 106 is greater than the maximum combined engine and electric-machine torque capacity, the method 100 moves to step 108 where a base transmission shift strategy is applied allowing a scheduled downshift in the transmission 24 to occur. The base transmission strategy may also allow the lock-up clutch 34 of the torque converter 22 to transition from a locked condition to an unlocked condition at step 108. The base transmission strategy may be based off of the maximum engine torque capacity. The method then ends at step 110.

If the torque demand at step 106 is not greater than the maximum combined engine and electric-machine torque capacity, the method moves to step 112. At step 112 it is determined whether the torque demand is greater than a maximum engine torque capacity. If the torque demand is not greater than the maximum engine torque capacity, the method 100 moves to step 114 where the base transmission shift strategy is applied maintaining a current transmission gear selection. The base transmission strategy may also allow the lock-up clutch 34 of the torque converter 22 to maintain a locked condition at step 114. The method then ends at step 110.

If the torque demand at step 112 is greater than the maximum engine torque capacity, the method 100 moves to step 116 where a specified period of time is calculated. The specified period of time may be a constant value stored in the controller 50 or may be dependent on one or many variables including, wheel speeds, vehicle speed, accelerator pedal position, transmission gear, ratio, or mode, transmission impeller speed, transmission turbine speed, torque converter lock-up clutch 34 status, deceleration or shift mode, battery temperature, voltage, current, or state of charge. The torque demand is then calculated again at step 118. At step 120 the electric-machine torque output is increased and the base transmission strategy is ignored inhibiting the scheduled downshift of the transmission 24. The transition of the lock-up clutch 34 of the torque converter 22 from a locked condition to unlocked condition may also be inhibited at step 120.

The method 100 then determines if the torque demand is greater than the maximum engine torque capacity at step 122. If the torque demand is not greater than the maximum engine torque capacity, the method 100 moves to step 114 where the base transmission shift strategy is applied maintaining a current transmission gear selection. The base transmission strategy may also allow the lock-up clutch 34 of the torque converter 22 to maintain a locked condition at step 114. The method then ends at step 110.

If the torque demand at step 122 is greater than the maximum engine torque capacity, the method 100 moves to step 124 where it is determined if the specified period of time has elapsed. If the specified period of time has not elapsed, the method returns to step 118 where the torque demand is once again recalculated. If the period of time has elapsed, the method moves to step 126 where the base transmission shift strategy is applied allowing the scheduled downshift in the transmission 24 to occur. The base transmission strategy may also allow the lock-up clutch 34 of the torque converter 22 to transition from the locked condition the an unlocked condition at step 126. The method then ends at step 110.

Figure 3:
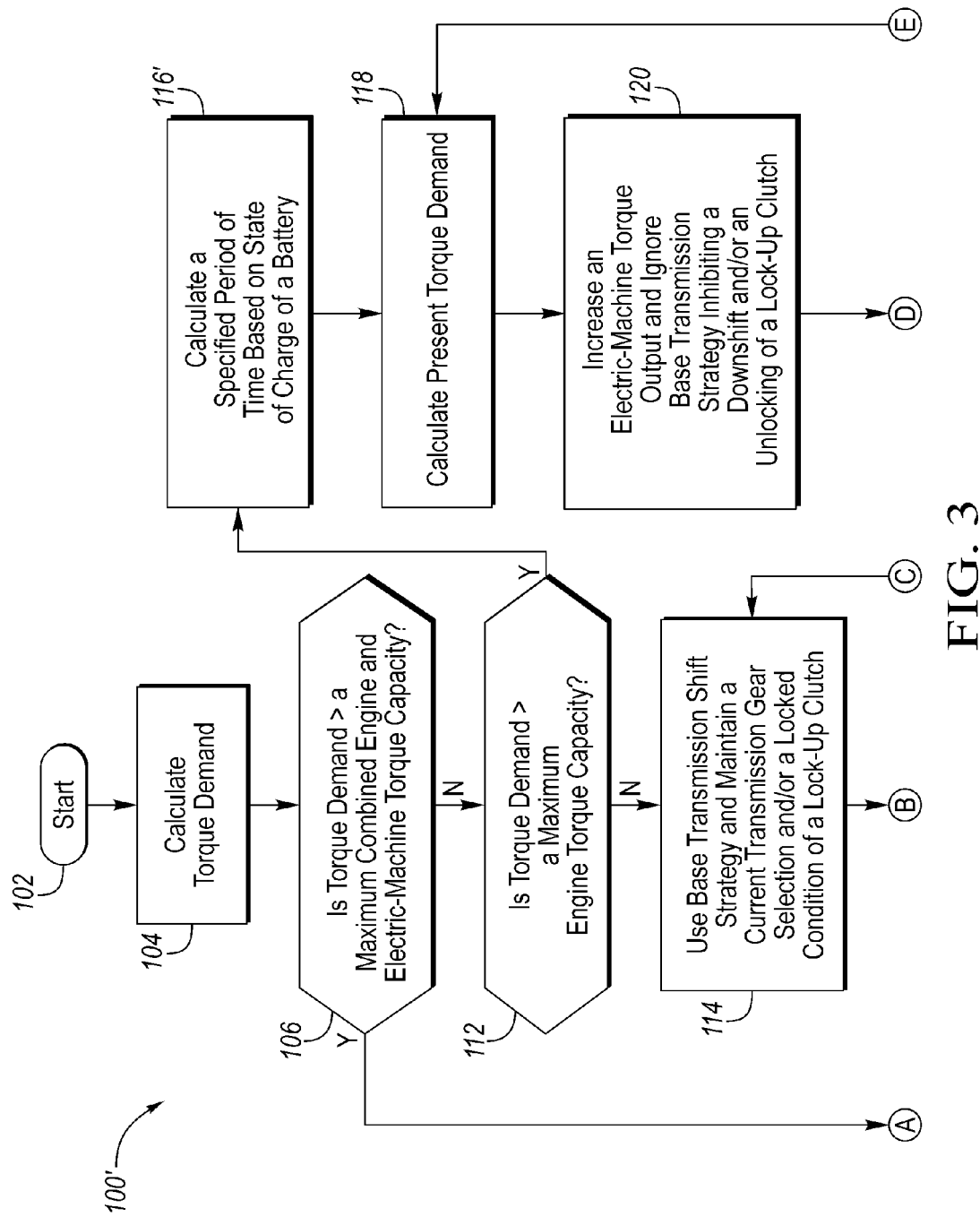
FIG. 3 is a flowchart illustrating an alternative embodiment of the prevent powertrain gear hunting method.
Figure 3:
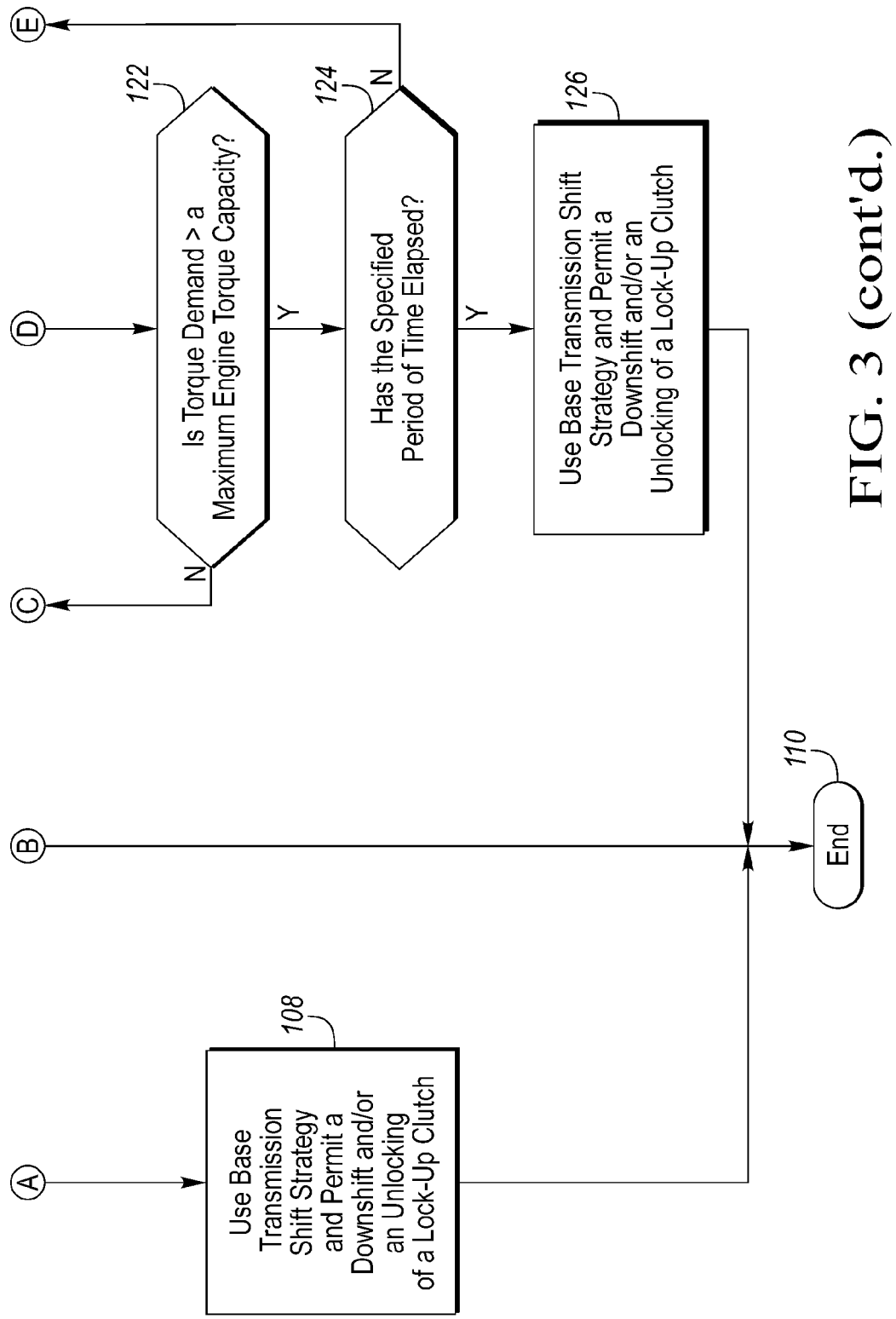

Referring to FIG. 3, a flowchart illustrating an alternative embodiment of the prevent powertrain gear hunting method 100' is illustrated. The alternative embodiment of the method 100' includes the same steps as method 100, except step 116 which is replaced by step 116'. At step 116' a specified period of time is calculated that is based on a state of charge of the battery 20. The specified period of time that is calculated in step 116' will increase with an increase in the battery state of charge and decrease with a decrease in the battery state of charge.

Although the embodiment illustrated in FIG. 1 depicts a parallel hybrid vehicle structure, the disclosure should be construed to include hybrid vehicle configurations that are capable of providing torque through a powertrain and to the wheels of the vehicle through an engine and electric-machine, either simultaneously or individually, including power-split or series-parallel hybrid vehicle configurations.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an engine;
    a motor; and
    a controller programmed to, in response to a torque demand being greater than a maximum torque capability of the engine but less than a maximum combined torque capability of the engine and motor, inhibit a scheduled transmission downshift and increase a torque of the motor for a specified period of time and, upon expiration of the specified period of time, permit the downshift to occur.

2. The vehicle of claim 1, wherein the controller is further programmed to, in response to the torque demand falling below the maximum torque capability of the engine prior to the expiration of the specified period of time, maintain a current transmission gear selection.

3. The vehicle of claim 1, wherein the controller is further programmed to, in response to the torque demand being greater than the maximum combined torque capability of the engine and motor, permit the scheduled transmission downshift.

4. The vehicle of claim 1, wherein the vehicle further comprises a torque converter having a lock-up clutch and wherein the controller is further programmed to inhibit a transition of the lock-up clutch from a locked condition to an unlocked condition for the specified period of time and, upon expiration of the specified period of time, permit the transition of the lock-up clutch from the locked condition to the unlocked condition.

5. The vehicle of claim 4, wherein the controller is further programmed to, in response to the torque demand falling below the maximum torque capability of the engine prior to the expiration of the specified period of time, maintain the locked condition of the lock-up clutch.

6. The vehicle of claim 4, wherein the controller is further programmed to, in response to the torque demand being greater than the maximum combined torque capability of the engine and motor, permit the transition of the lock-up clutch from a locked condition to an unlocked condition.

7. The vehicle of claim 1, wherein the specified period of time is based on a state of charge of a battery at a time when the torque demand exceeds the maximum torque capability of the engine.

8. A vehicle comprising:
    an engine;
    an electric-machine;
    a battery; and
    a controller programmed to, in response to a torque demand exceeding a torque limit of the engine but not a combined torque limit of the engine and electric-machine,
        prevent, for a specified period of time based on a state of charge of the battery, a downshift,
        increase, for the specified period of time, a torque output by the electric-machine, and
        upon expiration of the specified period of time, permit the downshift and decrease the torque output on the electric-machine.

9. The vehicle of claim 8, wherein the controller is further programmed to, in response to the torque demand falling below the torque limit of the engine prior to the expiration of the specified period of time, maintain a current transmission gear selection.

10. The vehicle of claim 8, wherein the controller is further programmed to, in response to the torque demand being greater than the combined torque limit of the engine and electric-machine, permit the downshift.

11. The vehicle of claim 8, wherein the vehicle further comprises a torque converter having a lock-up clutch and wherein the controller is further programmed to inhibit a transition of the lock-up clutch from a locked condition to an unlocked condition for the specified period of time and, upon expiration of the specified period of time, permit the transition of the lock-up clutch from the locked condition to the unlocked condition.

12. The vehicle of claim 11, wherein the controller is further programmed to, in response to the torque demand falling below the torque limit of the engine prior to the expiration of the specified period of time, maintain the locked condition of the lock-up clutch.

13. The vehicle of claim 11, wherein the controller is further programmed to, in response to the torque demand being greater than the combined torque limit of the engine and electric-machine, permit the transition of the lock-up clutch from a locked condition to an unlocked condition.

14. A method of controlling a hybrid vehicle having an engine and an electric-machine comprising:
    in response to a torque demand greater than a maximum engine torque capacity but less than a maximum combined engine and electric-machine torque capacity,
        increasing an electric-machine torque,
        inhibiting a scheduled transmission downshift for a specified period of time, and
        permitting the scheduled downshift to occur after the specified period of time has expired.

15. The method of claim 14, further comprising:
    in response to the torque demand falling below the maximum engine torque capacity prior to expiration of the specified period of time,
        maintaining a current transmission gear selection.

16. The method of claim 14, further comprising:
    in response to the torque demand being greater than the maximum combined engine and electric-machine torque capacity,
        permitting the scheduled transmission downshift.

17. The method of claim 14, wherein the hybrid vehicle further comprises a torque converter having a lock-up clutch, further comprising:
    in response to the torque demand being greater than the maximum engine torque capacity but less than the maximum combined engine and electric-machine torque capacity,
        inhibiting a transition of the lock-up clutch from a locked condition to an unlocked condition during the specified period of time.

18. The method of claim 17, further comprising:
    in response to the torque demand falling below the maximum engine torque capacity prior to expiration of the specified period of time,
        maintaining the locked condition of the lock-up clutch.

19. The method of claim 18, further comprising:
in response to the torque demand being greater than the maximum combined engine and electric-machine torque capacity,
permitting the transition of the lock-up clutch from the locked condition to the unlocked condition.

20. The method of claim 14, wherein the specified period of time is based on a state of charge of a battery at a time when the torque demand exceeds maximum engine torque capacity.

* * * * *